(No Model.)

C. C. TYLER.
MANUFACTURE OF MILLING CUTTERS.

No. 530,213. Patented Dec. 4, 1894.

Witnesses:
Robt. U. Ruddell.
Fred. J. Dole.

Inventor:
Charles C. Tyler.
By his Attorney,
F. H. Richards

UNITED STATES PATENT OFFICE.

CHARLES C. TYLER, OF HARTFORD, CONNECTICUT.

MANUFACTURE OF MILLING-CUTTERS.

SPECIFICATION forming part of Letters Patent No. 530,213, dated December 4, 1894.

Application filed April 11, 1894. Serial No. 507,136. (No model.)

*To all whom it may concern:*

Be it known that I, CHARLES C. TYLER, a citizen of the United States, residing at Hartford, in the county of Hartford and State of Connecticut, have invented certain new and useful Improvements in the Manufacture of Milling-Cutters, of which the following is a specification.

This invention relates to the manufacture of milling-cutters adapted for use in cutting gears and analogous purposes, the chief object of the invention being to furnish an improved method whereby relieved milling-cutters of the class specified may be produced having successive teeth separated by chip-spaces and in which the teeth shall be subjected to compression throughout their length, whereby the surface of the metal shall be compacted and solidified and the efficiency of the cutter thereby greatly increased, thus producing relieved milling-cutters having superior qualities with precision and economy.

Another object of the invention is to provide a method whereby the successive teeth may be formed in the periphery of the cutter-blank with the least possible disintegration or displacement of the metal at the junctions of the cutter-teeth, and to symmetrically true the cutting-edges or faces of the successive cutting teeth and at the same time remove any disintegrated metal at the junction of the teeth which may have accrued during the operation of compressing the tooth-surfaces.

Figure 1:
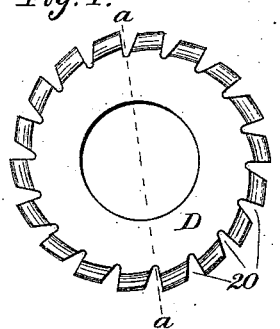
Figure 2:
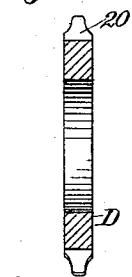
Figure 3:
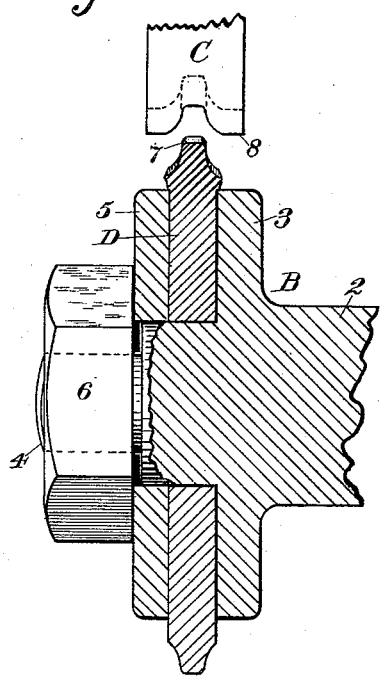
Figure 4:
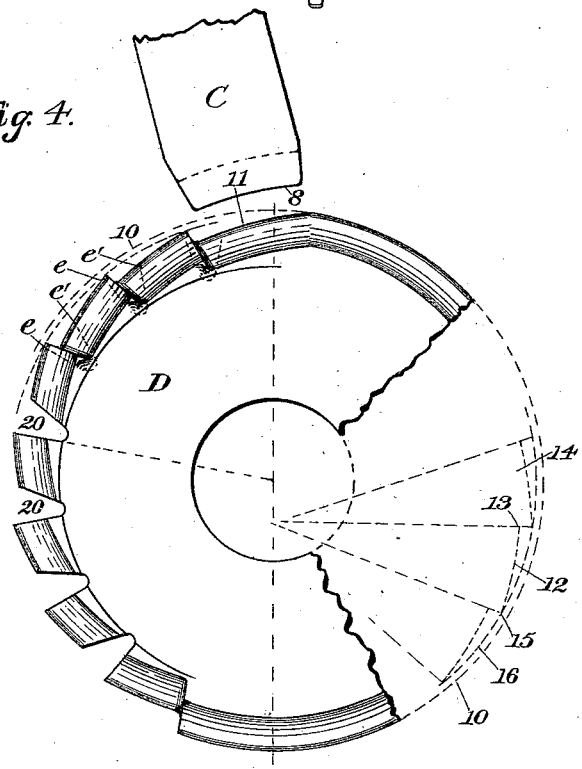

In the drawings accompanying and forming a part of this specification, Figure 1 is a side elevation of a completed milling-cutter adapted to be produced by my improved method. Fig. 2 is a cross-sectional view of the same taken on line *a—a*, Fig. 1. Fig. 3 is a sectional side elevation, on an enlarged scale, of a cutter-blank-carrying spindle with a cutter-blank secured in place and in position to be operated upon by the compressor-tool or tooth-forming tool, a portion only of a tool being shown in its operative position with relation to the cutter-blank. Fig. 4 is a side elevation, on a scale similar to Fig. 3, of a portion of a partially-formed milling-cutter constructed in accordance with my present invention, said figure illustrating two successive steps in the method of forming cutter-teeth in the cutter-blank.

Similar characters designate like parts in all of the figures.

In the manufacture of milling-cutters by my improved method or process, cutter-blanks are preferably used which are of slightly greater diameter than the required diameter of the finished cutters. The object of this is to make cutters of a definite and predetermined size with a high degree of uniformity and precision, notwithstanding that the blanks from which said cutters are formed may vary somewhat in diameter through inaccuracy in the preparation of the same. Accordingly the blank from which the cutter is to be formed will ordinarily be "over-size" and will be reduced to the required size of the finished cutter simultaneously with and by the operation of forming the teeth on said blank. By this means, when making small cutters, (for which my improvement is particularly adapted) the blanks may be first cut out by means of cutting dies from a sheet of metal of suitable thickness and quality, and afterward "toothed" without any intermediate preparation other than forming therein the usual central hole for the cutter-carrying arbor. Consequently by my new method or process I am enabled to produce milling-cutters of a high quality and precision at a very low cost and with, practically, unvarying uniformity.

As an instrumentality for reducing my improved method to practice, I usually employ a cutter-blank carrier, designated in a general way by B, and a tooth-forming compressor-tool, C. The carrier B and compressor-tool C are usually employed in connection with a machine (not shown) for forming milling-cutters, which machine is provided with means for intermittently rotating the cutter-blank-carrier to bring successive portions of the cutter-blank D carried thereby, into position to be acted upon by the compressor-tool, which compressor-tool is supported in position to act upon the cutter-blank and has means provided in connection therewith for reciprocating the same, all of which is well known in the art to which this invention appertains.

The cutter-blank-carrier B is herein shown as consisting of a carrier-spindle 2, having an annular bearing-flange, 3, near the outer end thereof (which outer end is threaded, as shown at 4); a washer, 5, and a binding-nut, 6, after the manner of ordinary cutter-spindles.

The tooth-forming compressor-tool C has in its working-face 8 a conformation coinciding with the cross-sectional form of the tooth to be made.

The milling-cutter blank D, which, in practice, will be of slightly greater diameter than the required diameter of the finished cutter, is firmly held upon the carrier-spindle 2 between the flange 3 and washer 5 with its periphery 7 projecting the requisite distance beyond the periphery of said flange and washer.

In the drawings, I have shown only one form of cutting tooth adapted to be produced by my improved method. It is desired to state, however, in this connection, that cutting teeth of various cross-sectional forms may be readily produced by my improved method by simply substituting a tooth-forming compressor-tool whose working-face, 8, coincides with the cross-sectional form of tooth it is desired to produce.

The tooth-forming compressor-tool, when making circular cutters of a definite diameter from an oversized blank, will be limited in its working-stroke to stop at a certain precise distance with relation to the axis of the cutter.

The operation of forming a tooth consists in subjecting successive portions of predetermined length of a blank in its unheated or natural condition to compression (by means of the compressor tool C) in a direction crosswise of the peripheral line of said portions where circular blanks are used as illustrated in Fig. 4 at right angles to the eccentric tooth-arc, which direction of movement being at such an angle with relation to a line radiating from the axis of the blank as to insure the requisite circumferential relief or backing-off for the finished tooth, and at the same time reduce the extent of compression at the cutting point of the tooth formed by said compression. This having been done once, as shown for instance at 11 in Fig. 4, the blank will be advanced to bring the succeeding tooth-forming portion into position to be operated upon by the compressor-tool C, and another compression will be similarly effected, this operation being repeated until the entire series of teeth have been formed.

In practice, the direction of movement with relation to and operation of the compressor-tool upon the successive tooth-forming portions of the blank will be such as to resist or restrict the outflow of metal during compression so as to practically equalize the compression throughout the major portion of the length of the tooth and at the same time leave a non-compressed, or a relatively non-compressed, portion contiguous to that part of the tooth-forming arc which is to form the cutting-face thereof.

In practice, I have found it highly advantageous in the manufacture of milling-cutter blanks adapted for producing milling-cutters having relieved teeth to compress successive portions of the periphery of said blank in such manner as to leave intervening non-compressed, or relatively non-compressed portions which will separate the compressed portion, and act, during the operation of compressing the successive portions, as abutments for sustaining the metal under compression against movement longitudinally of the tooth-forming portion, so that by this means the metal adjacent to the non-compressed portion being operated upon by the compressor-tool C will be, owing to the restriction of the flow of metal, subjected to substantially uniform compression throughout the entire length, or practically the entire length, of the tooth-surface, or that portion of the periphery of the blank which constitutes the tooth-surface of the finished cutter, thereby obviating the reduction of compression and consequent reduction in the stability and quality of the tooth-surface which would take place if the metal were free to flow longitudinally of the working face of the compressor-tool during the operation of forming the tooth-surface.

When an undersized blank D is used, the line 12, see Fig. 4, of the final compression of the tooth-surface extends from the root or base 13 of the preceding tooth 14 upward and forward to the intersection of the line 15 with the line 16 of the points of the cutting teeth and beyond to the peripheral line 10 of the blank, the non-compressed portion of each tooth-forming portion being immediately adjacent to the point designated by 15. The blank is now advanced through the arc (or space) from the point 13 to the point 15 and the operation is repeated. It will thus be seen that the true diametrical size of the cutter is within the axially concentric circle designated by the dotted line 16 intersecting the point 15 of the cutter-teeth, and that the positions of these points are determined by the angle of the line 12 and by the distance through which the blank is advanced between the successive compressions. It will also be seen that by my improved method the atoms of metal which finally constitute the cutting-point of the cutting tooth are positioned in the cutter-blank by the compression of that portion of said blank prior to the forming of the face of said cutter tooth, which face is formed simultaneously with the formation of the next succeeding tooth. This operation just described produces a milling cutter blank having a series of successive peripherally-relieved compressed teeth of indefinite precision as regards the cutting faces thereof with intervening non-compressed portions separating the successive teeth, leaving the blank in condition for forming the chip-spaces between adjacent teeth and for truing and finishing the cutting edges of said teeth.

During the operation of forming successive cutter teeth by peripherally compressing successive portions of the circumference of the cutter-blank by means of the compressor-tool C to form cutting-faces upon preceding teeth with indefinite precision, or a precision practically adapting the cutter for use with work in which the greatest cutting accuracy is not requisite, the compressor-tool, while it leaves non-compressed portions or relatively non-compressed portions intermediate to the successive cutter-teeth, will not produce a cutter of the higher qualities best adapted for the finest qualities of work, and especially such a cutter of the larger size.

To produce a milling-cutter from a blank formed substantially as hereinbefore described, the teeth of which cutter will have the highest degree of their cutting-edges, and as to their symmetrical coincidence, and relieve the finished cutter of any imperfection or inaccuracies due to the preliminary step in this method of forming cutter teeth, as before described, those portions of the cutter-blank between the dotted lines $e$ and $e'$ (see Fig. 4), which includes the non-compressed portions of the blank intermediate to the successive teeth together with slight portions adjacent thereto of the compressed portions of the blank, are cut away by milling or otherwise to form tooth-spaces or chip-spaces 20 between adjacent teeth. This operation of forming the tooth-spaces not only removes any inaccuracy in the formation of the tooth at the cutting edge thereof which might be caused by any slight disintegration or displacement of the metal during the formation of the tooth by compression as before described, but secures to the teeth clean-cut cutting faces whose edges are sharp and of coinciding angles, removes the non-compressed portion adjacent to said cutting-edges and leaves a compacted and solidified cutting-face, thereby producing a finished cutter of the highest quality adapted for the finer grades of work.

By my improved method hereinbefore described, a completed milling-cutter is formed by practically two operations, i. e., compressing the periphery of the cutter-blank to form a series of tooth-blank portions, the cutting-faces or ends of which are of indifferent precision, and subsequently forming truly-located cutting-edges by removing the metal at the junction of successive teeth.

Having thus described my invention, I claim—

1. The herein-described process of making milling-cutters of the class specified, which consists in successively compressing successive peripheral portions of a blank into tooth-form and restricting the flow of the metal during compression so as to secure a uniform compression throughout the major portion of the tooth-surface and at the same time leave a non-compressed, or a relatively non-compressed portion contiguous to one end of said tooth, and subsequently cutting away said non-compressed intermediate portions of the blank together with a slight portion adjacent thereto of the compressed portion of the blank to form the cutting-edges of the teeth and to form clearance-spaces or chip-spaces between successive teeth, substantially as described.

2. The herein-described process of making milling-cutters of the class specified, which consists in subjecting successive segments of predetermined length of a discous blank to compression crosswise of the length of said successive segments in such manner as to produce successive eccentric compressed tooth-arcs in the periphery of said blank with intervening non-compressed portions separating said tooth-arcs, and subsequently cutting away portions of the blank intermediate to said tooth-arcs to form the true cutting edges of the teeth and to form the clearance spaces between successive teeth, substantially as described.

CHARLES C. TYLER.

Witnesses:
FRED. J. DOLE,
F. H. RICHARDS.